United States Patent [19]
Gentry

[11] 3,853,766
[45] Dec. 10, 1974

[54] LIQUID SEPARATOR WITH COMMON BULKHEAD WALL SUPPORT FOR END-TO-END COALESCING UNITS

[75] Inventor: Bernard G. Gentry, Timberlake, N.C.

[73] Assignee: Midland-Ross Corporation, Cleveland, Ohio

[22] Filed: June 4, 1973

[21] Appl. No.: 366,662

[52] U.S. Cl................ 210/236, 210/301, 210/310, 210/336
[51] Int. Cl............................................ B01d 23/06
[58] Field of Search............ 210/23, 236, 301, 310, 210/336

[56] References Cited
UNITED STATES PATENTS

| | | | |
|---|---|---|---|
| 2,555,607 | 6/1951 | Robinson | 210/301 X |
| 2,766,890 | 10/1956 | Kasten | 210/23 X |
| 3,252,577 | 5/1966 | Anderson | 210/236 |
| 3,503,514 | 3/1970 | Lawson | 210/336 X |

*Primary Examiner*—Frank A. Spear, Jr.
*Attorney, Agent, or Firm*—Woodrow W. Portz

[57] ABSTRACT

Disclosed is apparatus for separating a dispersed liquid from a dispersion of two immiscible liquids wherein a shell is constructed with a bulkhead wall on which pairs of coalescing units are cantilever supported from opposite sides and in end-to-end communicating relationship through an opening of the wall in alignment with respective aligned center cavities of each pair of units. The units comprise removable liquid permeable coalescing media in cylindrical form which are removable from tubular supports of the units fixed to the wall. The units are closed at the distal ends to cause liquid to flow radially into one unit, then through the wall, and radially out of the associated unit. The shell is built in sections to separate in planes adjacent to the distal ends of the units so that the shell may be opened and the coalescing media easily and quickly replaced.

13 Claims, 6 Drawing Figures

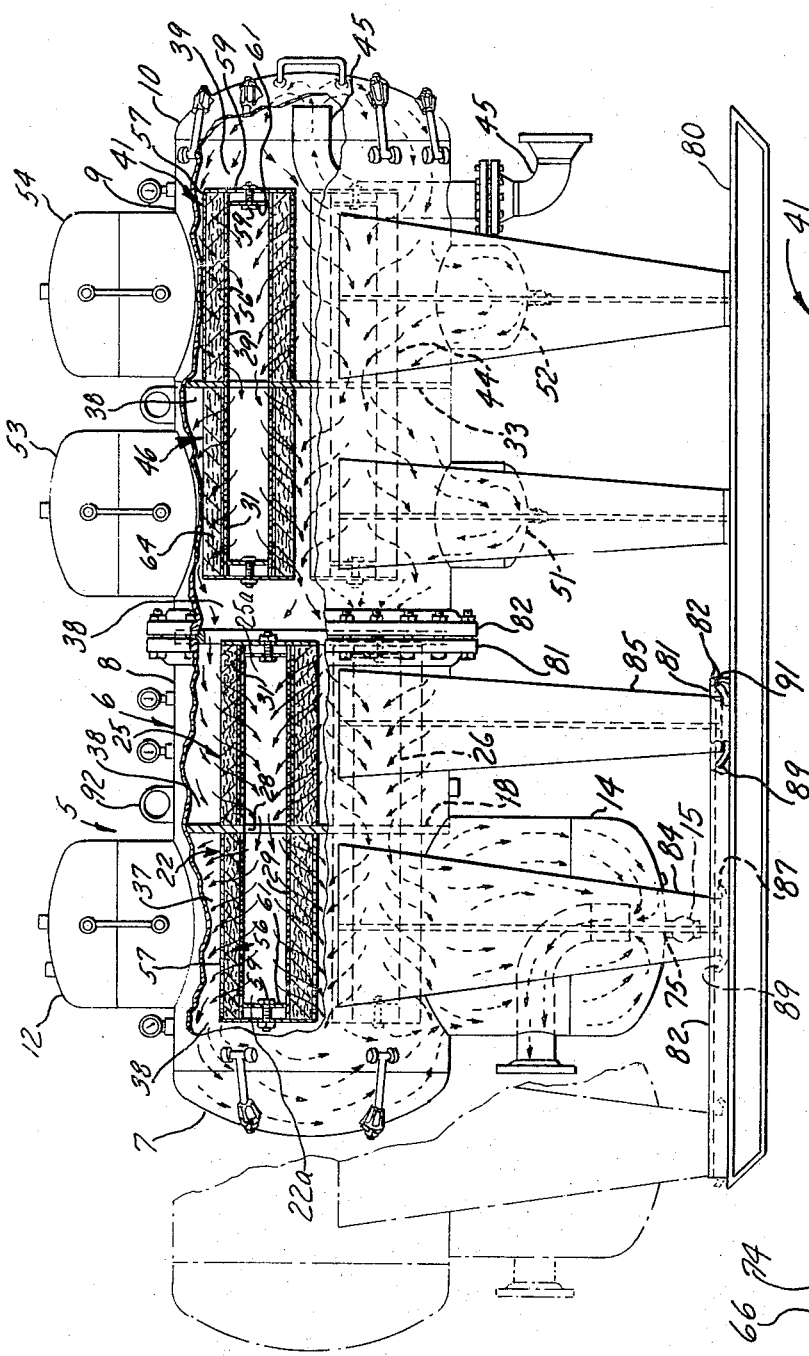

LIQUID SEPARATOR WITH COMMON BULKHEAD WALL SUPPORT FOR END-TO-END COALESCING UNITS

BACKGROUND OF THE INVENTION

Because of the increasing stringency of environmental standards imposed by government on all types of industry, it is becoming necessary to treat the liquid effluents of industrial plants, ships, etc. in ever increasing volume and efficiency. In the past few years, there has been a noticeable tendency to build liquid separators for immiscible liquid dispersions in progressively larger sizes. In the operation of such equipment, progressive loss of efficiency of media for coalescing dispersed liquids is inevitable especially when processing dispersions which carry particulate matter. As the efficiency of the coalescing media decreases to a predetermined point, the coalescing media must be replaced or reconditioned. High standards of purification require more frequent changing of the coalescing media.

On account of the massiveness of the liquid separators now in commercial demand, it is an object of this invention to construct liquid separators in a manner that will permit facile and rapid disassembly of the separator, and to provide the coalescing medial and support thereof in a form and construction correlated with other structure of the separator to achieve as much convenience and rapidity of replacement of coalescing media as now seen practical.

Another object is to provide a liquid separator design which is adapted for downstream elongation of both the shell and coalescing media by similar sections to meet any desired standards of liquid separation.

Another object is to provide liquid separating apparatus in large sizes which is divisible into components which are easily shipped across country and readily handled at the operating site by fork-lift trucks, cranes, etc.

SUMMARY OF THE INVENTION

The above and other objects of the invention are achieved in a liquid separator comprising a shell or housing divisible into end sections or doors and body sections which are all separable one from the other, and provides an inlet duct at the upstream end of the shell for feeding a liquid to the separator which passes progressively through the various sections to the downstream end at which an outlet duct is provided for expelling liquid from the separator. Each of the body sections is bridged in sealable relation with its interior surface by a bulkhead wall extending transversely of the length of the principal direction of flow through the separator. Perforated tubular supports are attached by longitudinally aligned pairs to opposite sides of the bulkhead wall in alignment also with an opening through the wall which permits communication from the interior of one tubular support to the other of each associated pair. Liquid permeable coalescing medium is received on each support with the resulting assembly made substantially liquid-tight at its distal end. Such construction results in open regions between the bulkhead walls and within the ends of the shell occupied by coalescing units extending from adjacent bulkhead walls. The shell sections are separable along planes transverse to each region adjacent the distal ends of the coalescing unit for access to and removal of the coalescing media of the units. The shell has vertically-extending space-enclosing means which may be contiguously located at the top and/or bottom of each region for collecting liquids which are lighter or heavier respectively than the dispersing liquid of the dispersion.

BRIEF DESCRIPTION OF THE DRAWING

FIG. 4 is an enlarged side elevation of the separator with portions broken away and sectioned to illustrate the construction of internally supported coalescing units;

FIG. 5 is a fragmentary enlarged longitudinal elevation in section of one type of coalescing unit occurring in the separator of FIGS. 1 to 4; and FIG. 6 is a fragmentary enlarged longitudinal elevation in section of a second type of coalescing unit occurring in the separator of FIGS. 1 to 4.

DESCRIPTION OF THE PREFERRED EMBODIMENT

Figure 1:
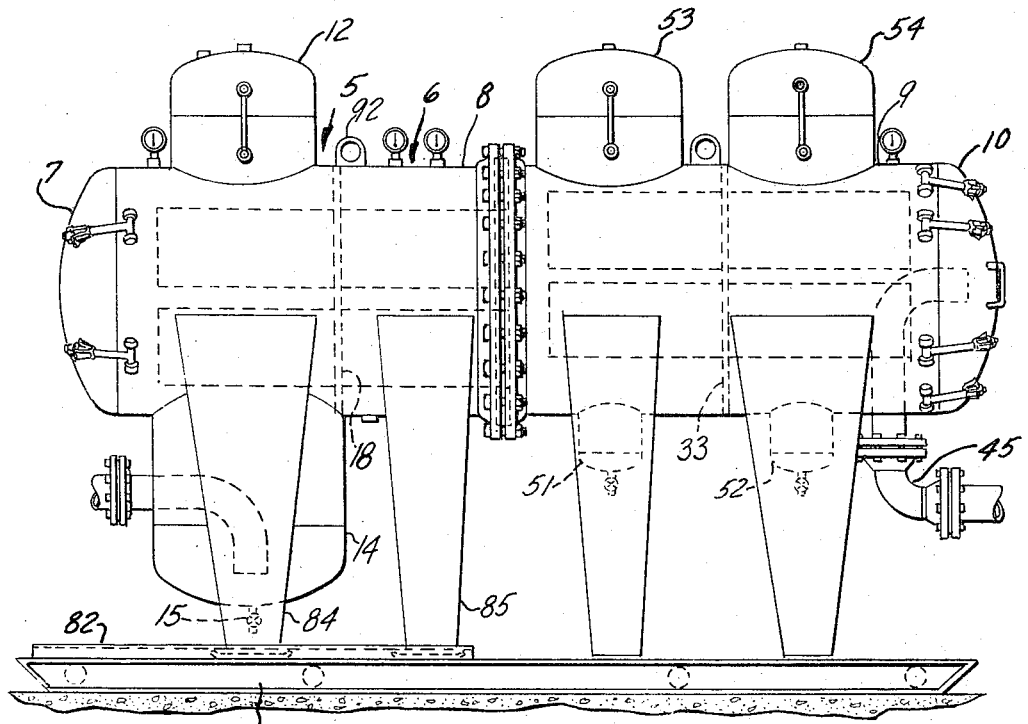
FIG. 1 is a side elevation view of a separator in accordance with this invention.
Figure 2:
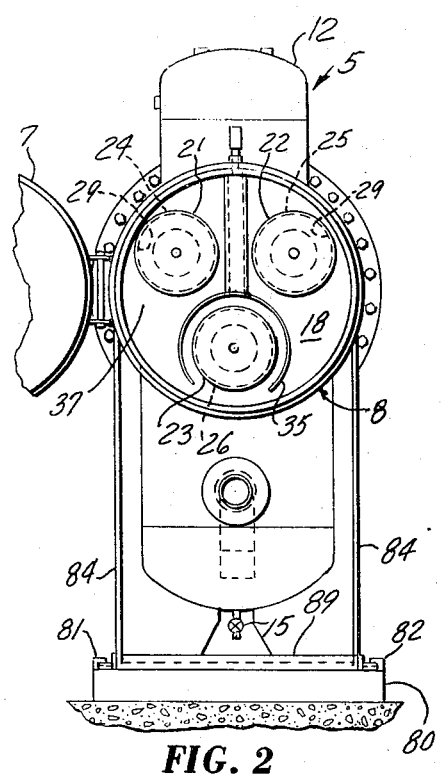
FIG. 2 is an end elevation of the downstream end of the separator with the end door open to show internal structure.

As shown especially in FIGS. 1 and 4, the separator 5 comprises a shell 6 which consists of a downstream end section or door 7, a downstream body section 8, an upstream body section 9 and an upstream end section or door 10. Both body sections comprise vertically extending space-enclosing structure for collecting dispersed liquid coalesced from the dispersion entering the separator. For example, the body shell section 8 comprises a dome 12 extending upwardly from the main cylindrical portion of section 8 and an elongate sump leg 14 extending downwardly therefrom. The function of the leg is to permit flow from the coalescing units in section 8 downwardly along a flow path of large cross section at a rate sufficiently slow to allow droplets of lighter weight liquid which had entered the separator as dispersed liquid to ascend toward the dome 12. The leg 14 also allows opportunity for a dispersed immiscible liquid heavier than the dispersing liquid of the dispersion to settle out at the bottom of the leg by which it may be drained off occasionally through a valve vent 15.

The shell section 8 further comprises a bulkhead wall 18 which, by cantilever arrangement, supports coalescing units 21,22,23 on the downstream side and coalescing units 24,25,26 on the upstream side of the wall 18. Units 21,22,23 are paired coaxially with units 24,25,26 respectively and the central cavities of each aligned pair are open to each other through the bulkhead wall by an opening therethrough in alignment with the cavities of each paired coalescing unit. As shown with respect to longitudinally aligned units 22,25, an opening 28 in the bulkhead wall aligned with cavities 22a and 25a causes the cavities and the opening to become a single liquid conducting chamber.

As shown, each coalescing unit is supported on a support, such as support 29 or 31, which are the same diameter but may differ in length. For standardization, all coalescing unit supports have the same diameter. In this connection, it will be noted that the bulkhead wall 33 of the shell section 9 has similar supporots 29,31.

As a further feature of the portion of the separator housed in shell section 8, the coalescing unit 23 is partially enclosed by a baffle or shroud 35, which is welded or otherwise fixed to the bulkhead wall 18 and extends substantially the full length of the unit 23. The baffle 35, as shown, is C-shaped or partially cylindrical and has its circumference open along its entire length underneath the unit 23. The purpose of baffle 35 is to improve the current pattern of effluent flowing from region 38 into the leg 14 in such a way as to more effectively permit separation of any dispersed liquid that may reach the final downstream region 37. A duct 36 extends vertically upward into the bottom of the dome 12 from the baffle 37 to conduct coalesced material from the unit 23 to the space within the dome 12. Other regions of the separator are the middle region 38 extending between the walls 18,33, and the upstream 39 extending from the inner surface of the door 10 to the wall 33.

Figure 3:
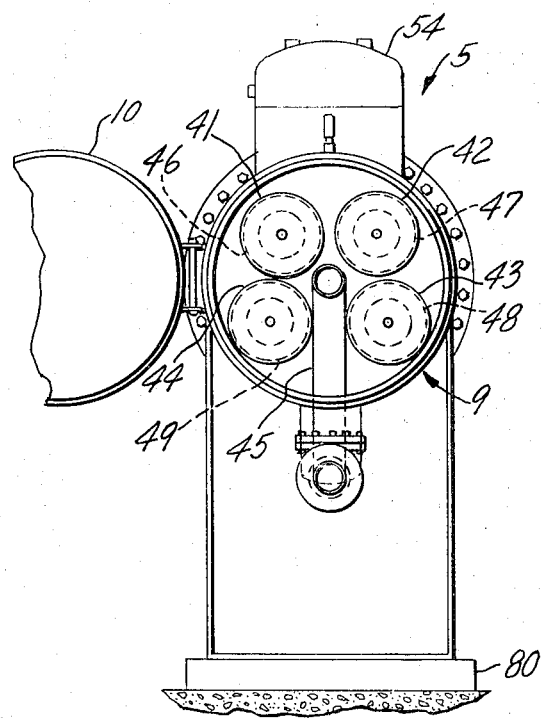
FIG. 3 is an end elevation of the upstream end of the separator with the end door open to show internal structure.

FIG. 3 shows that zone 39 contains four coalescing units 41,42,43,44 with the lower units 44,43 spaced to provide room for the inlet duct 45. FIG. 4 shows that the inlet duct enters the shell section 10 at the bottom and is formed to a curved 90 degree turn toward the inner surface of the door 10 to face longitudinally toward the center of the door and thus discharge liquid against the interior cupped surface of the door to attain an initial radial distribution of the liquid before it flows horizontally to the various coalescing units. Each of the units 41,42,43,44 has its cooperating or counterpart unit 46,47,48,49 respectively on the opposite side of the bulkhead wall 33 which has aperture in alignment with the cavities of paired in-line coalescing units attached to that wall as heretofore described with respect to wall 18. In the event that the separator 5 tends to separate any immiscible dispersed liquid component heavier than the dispersing liquid, the shell section 9 comprises lower domes 51, 52 in diametrically opposite relation with top domes 53, 54 respectively. The lower domes 51, 52 are also useful for collecting solid suspended matter which tends to settle out during operation when back flushing is resorted to.

In the embodiment illustrated, coalescing units 21-23 and 41-44 each comprise (see FIG. 6) a coalescing medium 56 which consists of an initially rigid fibrous material in cylindrical form which may be readily slid in endwise fashion over the distal end of support 29 toward and against the respective supporting bulkhead wall. Because the fibrous material loses its ability to be self-supporting after some use, coalescing medium 56 also includes a closed end cylindrical sleeve 57 of material such as foraminous light gauge metal along the cylindrical portion and heavier gauge non-foraminous material in the end portion 58. The sleeve 57 is secured in endwise direction against the wall 18 by means, such as a bolt 59 anchored in an endplate 61, fixed as by welding in the end of the support 29 extending through the endplate 58 of the sleeve 57. The fibrous material of coalescing medium 59 maybe, for example, of glass fiber and phenolic binder construction.

Each of the coalescing media of units 24 to 26 and 46 to 49, all located in the central region 38, comprises (see FIG. 5) an inner flanged sleeve 65 having fixed to its sleeve portion a flange element 66 extending radially outwardly therefrom, and a fibrous material 67 formed around the sleeve element. Medium of this type is ordinarily prepared by wrapping the sleeve 65 with fluffy or low density strand or cord of, e.g., coarse denier nylon. The resulting assembly is easily removable from the tubular support 31 since the sleeve 65 is constructed to provide a few thousandths of or inch clearance with the outer surface of the support 31. The coalescing medium comprising the flanged sleeve 65 and the fibrous material wrapped thereon are easily secured from endwise movement and sealed at the distal end of the unit by providing a detachable endplate 71 apertured at the center to receive a bolt 72 and having a diameter substantially matching that of the flange 66. Plate 71 is connected to the fixed endplate 73 of a respective support 31 by the bolt and tightened against a resilient gasket 74 sandwiched between the plate 71 and the flange 66.

With all coalescing units mounted for operation, a dispersion to be treated is fed into the separator through the lower end of the inlet pipe 45 and distributed radially by its impingement against the interior surface of the door 10 and then circulated to the exterior surfaces of the units 41, 42, 43, 44. First stage coalescing of dispersed liquid takes place as the liquid passes inwardly of these units and flows in a downstream direction within the cavities thereof into the cavities of units 46, 47, 48, 49. Any coalesced material separating from the units in region 39 either ascends or descends within the region in accordance with its greater or lesser specific gravity than that of the dispersing liquid to the domes 54 or 52. Liquid dispersion to be further separated enters the intermediate region 38 by passing radially outwardly through the media of coalescing units 46 to 49, then downstream within the region 38 to enter units 24, 25, 26 in a radially inward direction. In this manner, two further steps of coalescing of dispersed material is accomplished within region 38. Coalesced liquid then collects in respective domes 53 or 51. Liquid thus entering the cavities of units 24 to 26 passes downstream through respective apertures of the bulkhead wall 18 into the final downstream coalescing units 21, 22, 23 in aligned relation with units 24, 25, 26 respectively. Final collection of dispersed material is accomplished either in the dome 12 or at the bottom of the leg 14 and the purified dispersing liquid thence passes outwardly of the separator through the exhaust duct 75.

An essential object of the invention being the rapid exchange of coalescing units, the problem of quickly exchanging units within the end regions 37 and 39 is solved by draining the separator, opening the hinged doors 7 and 10, and replacing the coalescing media over distal support ends. Opening of the doors 7, 10 entails loosening of the bolts 76 shown hinged at one end to respective body shell sections with the threaded end portions received in U-shaped elements 77 welded to the doors at angular intervals about the separator axis. To change the units within region 38, the shell sections 8 and 9 are separated along the plane of engagement of flanges 81, 82 welded or otherwise fixed to shell sections 8, 9 respectively. The flanges during operation are bolted together as shown. The separator sections and all equipment contained therein separate along the plane of flange engagement by unbolting the flanges and moving the sections apart.

To facilitate this separation and the bringing of these sections back into proper alignment and registry for being bolted together again, at least one of the sections is made movable toward and away from the adjacent section along a supporting base 80. Guide means, such as tracks 81 and 82, are fixed to the base at a spacing to receive, e.g., 84, 85 of the shell section 8. The bottom plates 87, 89 are provided with upturned edges, such as edge 91, to facilitate the movement of the section 8 over the base 80. Such construction permits the section 8 to be lifted away from the section 9 by a crane connected to section 8 through a lifting eye 92, or section 8 may be towed and pushed by equipment, such as tractors, fork-lift trucks, etc. Movable shell sections, such as section 8, may be rendered manually movable without power equipment by anti-friction means such as rollers incorporated in the legs to engage the base 80, not shown. It will be understood that a separator in accordance with this invention may comprise more than one movable section and more sections than those shown and described herein. For example, a larger separator could comprise one or more additional sections which duplicate the structure of either section 8 or 9 and the apparatus supported therein.

What is claimed is:

1. A separator for treating dispersions of immiscible liquids to separate one liquid from another comprising:
   a shell having inlet and outlet means defining a direction from one end portion of the shell to its opposite end portion;
   a bulkhead wall supported in said shell separating a first region from a second region within the shell;
   a plurality of cylindrical coalescing units, each comprising a tubular perforated support fixed to said wall and defining a central cavity, a liquid-permeable cylindrical coalescing medium removably supported on the exterior surface of said support, said units being supported by said wall in longitudinally aligned end-to-end pairs in cantilever relation with opposite sides of the wall with their cavities in alignment with an opening through the bulkhead wall;
   said units being closed at distal ends to form the cavities of an aligned pair of units into a single liquid conducting chamber closed at both ends, said media being removable from respective supports over the ends thereof in an endwise direction;
   said bulkhead wall joining the inner periphery of the shell in substantially sealed relationship;
   said shell being constructed in sections including end sections separable along planes generally parallel to said bulkhead wall adjacent the distal ends of said units; said shell defining vertically extending space-enclosing means for collecting coalesced dispersed liquid in contiguous vertical relation with any of said regions containing said units.

2. A separator for treating dispersions of immiscible liquids to separate one liquid from another comprising:
   a shell having inlet and outlet means defining a direction of flow from one end portion of the shell to its opposite end portion;
   a first bulkhead wall supported in said shell separating a first region from a second region in downstream relation within the shell with the first region;
   a plurality of cylindrical coalescing units, each comprising a tubular perforated support fixed to said wall and defining a central cavity, a liquid-permeable cylindrical coalescing medium removably supported on the exterior surface of said support, said units being supported by said wall in coaxial end-to-end pairs in cantilever relation with opposite sides of the wall and in concentricity with an opening through the bulkhead wall;
   said units being closed at distal ends to form the cavities of a concentric pair of units into a single liquid conducting chamber closed at both ends, said media being removable from respective supports over the ends thereof in an endwise direction;
   said bulkhead wall joining the inner periphery of the shell in substantially sealed relationship;
   said shell being constructed in sections including end sections separable along planes generally parallel to said bulkhead wall adjacent the distal ends of said units;
   said shell defining vertically-extending space-enclosing means for collecting coalesced dispersed liquid in contiguous vertical relation with any of said regions containing said units.

3. The separator of claim 2 comprising:
   a second bulkhead wall spaced downstream from said first bulkhead wall to define said second region and a third region downstream from the second wall;
   certain of said units being attached to each wall to extend toward the other wall within said second region, the units of said certain units connected to the first bulkhead wall being arranged to discharge liquid into the second region and the units of said certain units connected with the second wall being arranged to receive liquid from the second region and conduct it into units of the third region.

4. The separator of claim 2 comprising a plurality of walls similar to said bulkhead wall spaced in said direction of flow to define a series of regions, the units of said coalescing units that project upstream from respective bulkhead walls being arranged to receive liquid radially inwardly from the surrounding region, and units projecting downstream from respective bulkhead walls being arranged to discharge liquid into the surrounding region whereby liquid traverses a region by passing out of units projecting downstream and into units of the next downstream bulkhead wall projecting upstream.

5. The separator of claim 1 wherein:
   said shell comprises a downwardly elongate sump leg extending from the lower extremity of the final region in said shell; and
   said outlet means is located to receive liquid from a lower portion of said leg and pass it outwardly of the separator.

6. The separator of claim 1 wherein:
   said separator comprises a plurality of said coalescing units in a final downstream region of the shell of which one unit is located in a lower central portion of said final region;
   said separator further comprising a baffle of C-shaped cross section, open at the bottom and extending substantially the full length of said unit in partially surrounding relation with said unit except for being open along the underside thereof.

7. The separator of claim 6 wherein:
   a downstream section of said shell surrounding said final region having, as a portion of said vertically extending space forming means, a dome at the top of said shell section; and said separator comprises a vertical duct which connects with the top of said baffle and extends upwardly into proximity with said dome to permit the passage of liquid therethrough from the space between said baffle and said unit received therein.

8. The separator of claim 1 wherein:

said end sections are separable doors normally secured in sealed relation to respective next adjacent shell sections; and said separator comprises quickly-releasable fastening means for securing said doors to said adjacent shell sections.

9. The separator of claim 8 wherein:

said doors are of cupped, outwardly-convex shape and said separator comprises means for connecting each door in hinged relation with said next adjacent shell section.

10. The separator of claim 8 wherein:

the upstream end door is of cupped, outwardly convex shape and said inlet means is shaped to direct a stream toward the inner surface of said door in an axial direction against the center thereof.

11. The separator of claim 1 comprising:

a base for supporting said shell; and guide means shared by sections of the shell and the base defining a path of relative movement of said sections in a direction parallel to said direction of flow.

12. The separator of claim 11 wherein:

said guide means comprises legs fixed to said relatively movable sections and in engagement with said base, said base having rectilinear guide means engaging the legs of at least one of said sections and confining the movement thereof to the direction of said path.

13. The separator of claim 12 wherein:

the legs of one shell section are fixed to said base and any other sections provided with said legs are movable while supported by respective legs along said guide means and the base, said guide means permitting movement of each movable section into and out of operating registry with the next adjacent shell section.

* * * * *